United States Patent [19]

Hedgewick

[11] Patent Number: 5,053,182
[45] Date of Patent: Oct. 1, 1991

[54] ONE PIECE SAFETY CAP MOLDING APPARATUS AND METHOD

[75] Inventor: Peter Hedgewick, Windsor, Canada

[73] Assignee: Caran Engineering Investments, Inc., Nassau, The Bahamas

[21] Appl. No.: 402,555

[22] Filed: Sep. 5, 1989

[51] Int. Cl.[5] .............................................. B29C 33/48
[52] U.S. Cl. .................................... 264/318; 264/334;
425/438; 425/DIG. 58; 249/63; 249/68;
249/144
[58] Field of Search ................. 264/318, 328.1, 328.11,
264/334; 425/DIG. 58, 438, 556, 577; 249/59,
63, 68, 142, 144

[56] References Cited

U.S. PATENT DOCUMENTS 3,618,170 11/1971 Owens .................................... 249/59
4,019,711 4/1977 Altenhof et al. ....................... 249/59

FOREIGN PATENT DOCUMENTS 1589051 5/1981 United Kingdom ................. 264/318

*Primary Examiner*—Jill L. Heitbrink
*Attorney, Agent, or Firm*—Gifford, Groh, Sprinkle, Patmore and Anderson

[57] ABSTRACT

An apparatus for molding a cap (16) including a base portion (18) and peripheral skirt (20) extending axially from and about the base portion (18) includes an outer surface forming mold (44) for forming an outer surface of the base portion (18) and the peripheral skirt (20) and an inner surface forming mold (46) seatable within the outer surface forming mold (44) for forming an inner surface of the base portion (18) and the peripheral skirt (20). The outer surface forming mold (44) is retractable from seated engagement with inner surface forming mold (46) for exposing the molded cap (16) therebetween. The inner surface forming mold (46) includes a core portion (52) and lug forming mold portions (54) disposed radially peripherally thereabout, the lug forming mold portions (54) being able to project axially from and retract radially inwardly relative to the central core portions (52) for releasing and ejecting the molded cap (16) from the inner surface forming mold (46).

6 Claims, 4 Drawing Sheets

ONE PIECE SAFETY CAP MOLDING APPARATUS AND METHOD

TECHNICAL FIELD

This invention relates generally to safety closure and container assemblies and methods and apparatus for making the same. In particular, the present invention is concerned with improvements of apparatus for making safety closure and container assemblies and the closures per se wherein it is necessary to form a cap including a skirt portion having radially inwardly extending locking lugs.

BACKGROUND OF THE INVENTION

Safety closures and container assemblies have been developed to reduce the number of accidental poisonings resulting from young children who have access to unsafe medicines, drugs, household chemicals, and other products. For example, the U.S. Pat. No. 3,482,814 to Hedgewick, issued Dec. 9, 1969 discloses a mold apparatus for making safety caps having a base, peripheral flange and a plurality of radially inwardly extending lugs on the inner surface of the peripheral flange adapted to engage notches on projections of a container. An apparatus is disclosed for molding the cap member, the apparatus including a core body fixed to a core retainer plate and a stripper and core ring which is removable axially relative to the core retainer plate for axially displacing a cap formed on the core body. A plurality of circumferentially spaced pins are yieldingly urged upwardly by a spring to in turn tend to urge the stripper and core ring axially upwardly thereby displacing a molded cap from the core member.

Reissue U.S. Pat. No. 27,156 to Hedgewick, issued July 20, 1971 also discloses a safety cap and container assembly. The U.S. Pat. No. 4,444,327 to Hedgewick, issued Apr. 24, 1984, discloses a tight vial assembly with a one piece cap. The cap includes a base portion and skirt portion extending axially therefrom and lugs extending radially inwardly from the skirt portion. A yieldable ring portion perfects a seal with the lip of the container as it is urged against the lip of the container during the engagement of the lugs with the outer surface of the container.

The present invention provides a mold apparatus and method for manufacturing safety caps including the radially inwardly extending lugs from the skirt portion of the caps. The invention further provides a cap construction manufactured by the aforementioned inventive process.

SUMMARY OF THE INVENTION

In accordance with the present invention, there is provided an apparatus for molding a cap including a base portion and a peripheral skirt extending axially from and about the base portion. The apparatus includes outer surface mold means for forming an outer surface of the base portion and the peripheral skirt and inner surface mold means seatable within the outer surface mold means for forming an inner surface of the base portion and the peripheral skirt. The outer surface mold means is retractable from seated engagement with the inner surface mold means for exposure of the molded cap therebetween. The inner surface mold means includes a core portion and cap release means for projecting axially from and retracting radially inwardly relative to the core portion for releasing and ejecting the cap from the inner surface mold means.

The invention further provides a method of molding the aforementioned cap, the method including the steps of seating an outer mold portion about a core portion for defining a mold cavity therebetween and forming an outer surface of the base portion and the peripheral flange within the outer mold portion. An inner surface of the base portion and the peripheral skirt are also formed about a core portion. The mold cavity is retracted from the seated engagement with core portion exposing the formed cap member. A peripheral mold portion of the core portion is projected axially from and retracted radilly relative to the remainder thereof for releasing and ejecting the formed cap from the core portion.

Further, the present invention provides a cap member including a base portion and peripheral skirt extending axially from and about the base portion. A plurality of spaced lugs extend radially inwardly from the peripheral skirt. The skirt includes an edge having squared off portions in between outwardly tapering portions, the lugs extending inwardly from the outwardly tapering portions.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
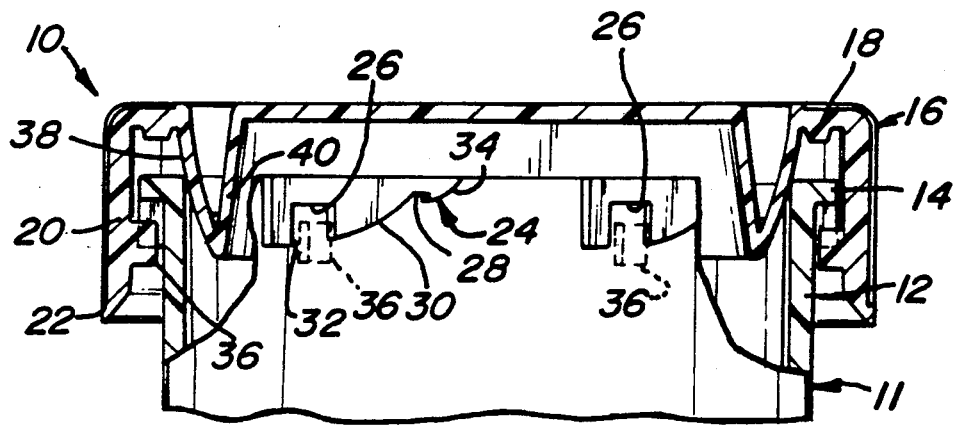
FIG. 1 is a sectional view of a safety closure and container assembly of the present invention, partially broken away, with the cap applied to the container with the container locking elements of the cap shown in phantom in the their locked position.
Figure 2:
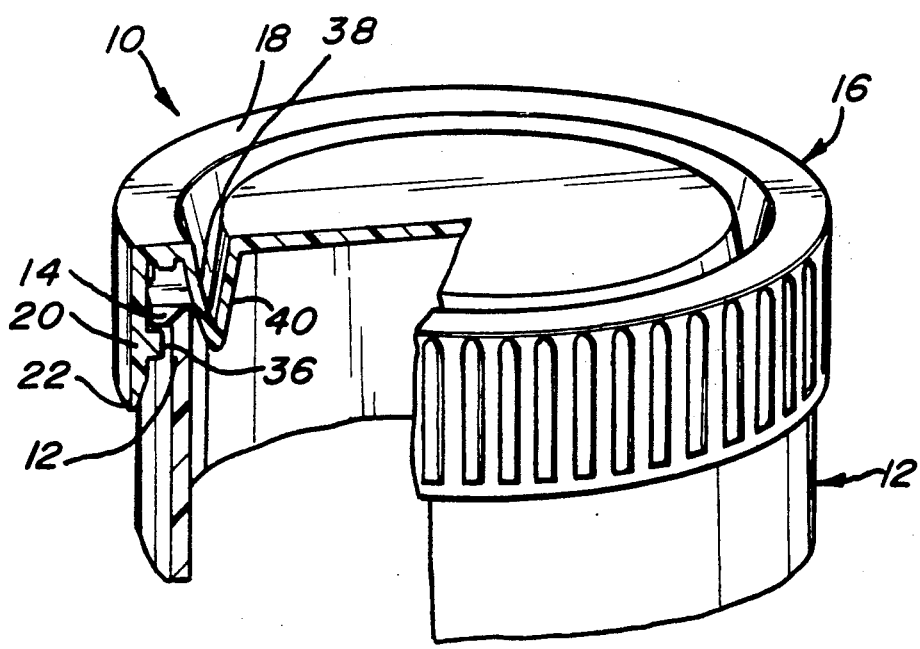
FIG. 2 is a perspective view of the present invention partially broken away and in cross section showing the cap applied to the container in the locked position.
Figure 3:
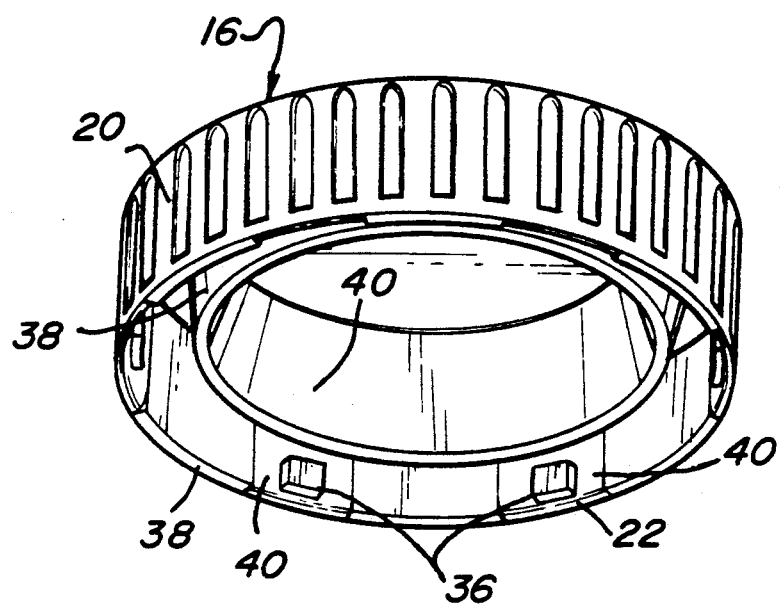
FIG. 3 is a perspective view of the subject cap.

A safety closure and container assembly constructed in accordance with the present invention is shown at 10 in FIGS. 1 and 2. The assembly 10 includes a container generally designated at 11 having a neck or mouth portion 12 within an annular rim 14.

The assembly 10 includes a cap generally indicated at 16, integrally molded from a polymer such as polypropylene.

The cap 16 includes a relatively stiff outer annular base portion 18 with a peripheral skirt or flange portion 20 projecting axially therefrom for receiving the mouth portion 12 of the container 10. The skirt 20 has a free end 22 opposite the base portion 18.

Formed on the outer surface of the mouth portion 12 of the container 10 is a plurality of container locking elements generally indicated at 24 of the bayonet type which are spaced peripherally from each other on the outer surface of the mouth portion 12. Each container locking element 24 includes a pair of sockets or first and second notches 26,28, respectively. The first notch 26 is formed between a cam surface 30 and a depending stop portion 32. The second notch 28 is formed between the cam surface 30 and a second cam surface 34.

A plurality of cap locking elements 36 in the form of bayonet lugs are spaced peripherally from each other and project from the inner surface of the skirt 20 radially inwardly. The lugs 36 are integrally molded with the skirt 20. The lugs 36 act as a bayonet locking mechanism in the sense that they cooperate in bayonet fashion with the container locking elements 24. The cap locking elements or lugs 36 are complementary to the container locking elements 24, such that the cap locking elements are engageable with the second and first notches 28,26, respectively, by relative axial motion of the cap 16 towards the container 10 followed successively by rotative motion of the cap 16 relative to the container 10.

The cap 16 is biased against the axial movement from the locked engagement with the container 10 and a liquid and moisture seal is maintained for the contents of the container 10 by a spring like sealing portion 38 and a spring like annular biasing portion 40, both of which are formed integrally with outer annular base portion 18. The more particular structure and function of the sealing portion 38 and baising portion 40 are disclosed in detail in U.S. Pat. No. 4,444,327 to applicant and incorporated by reference herewith.

The skirt portion 20 includes an axial end or edge portion 22 thereof. The edge 22 includes squared off portions 38 in between outwardly tapering portions 40. The lugs 36 extend inwardly from the outwardly tapering portions 40. In other words, the inner surfaces of the skirt 20 having the lugs 36 extending therefrom taper inwardly from just below the lugs 36 to the edge 22 of the skirt 20. In between the tapering areas are areas of edge 38 which have squared bottoms. The tapered edges 40 are formed so as to cooperate with the subject apparatus described below for manufacturing the cap members 16 pursuant to the present invention.

Figure 4:
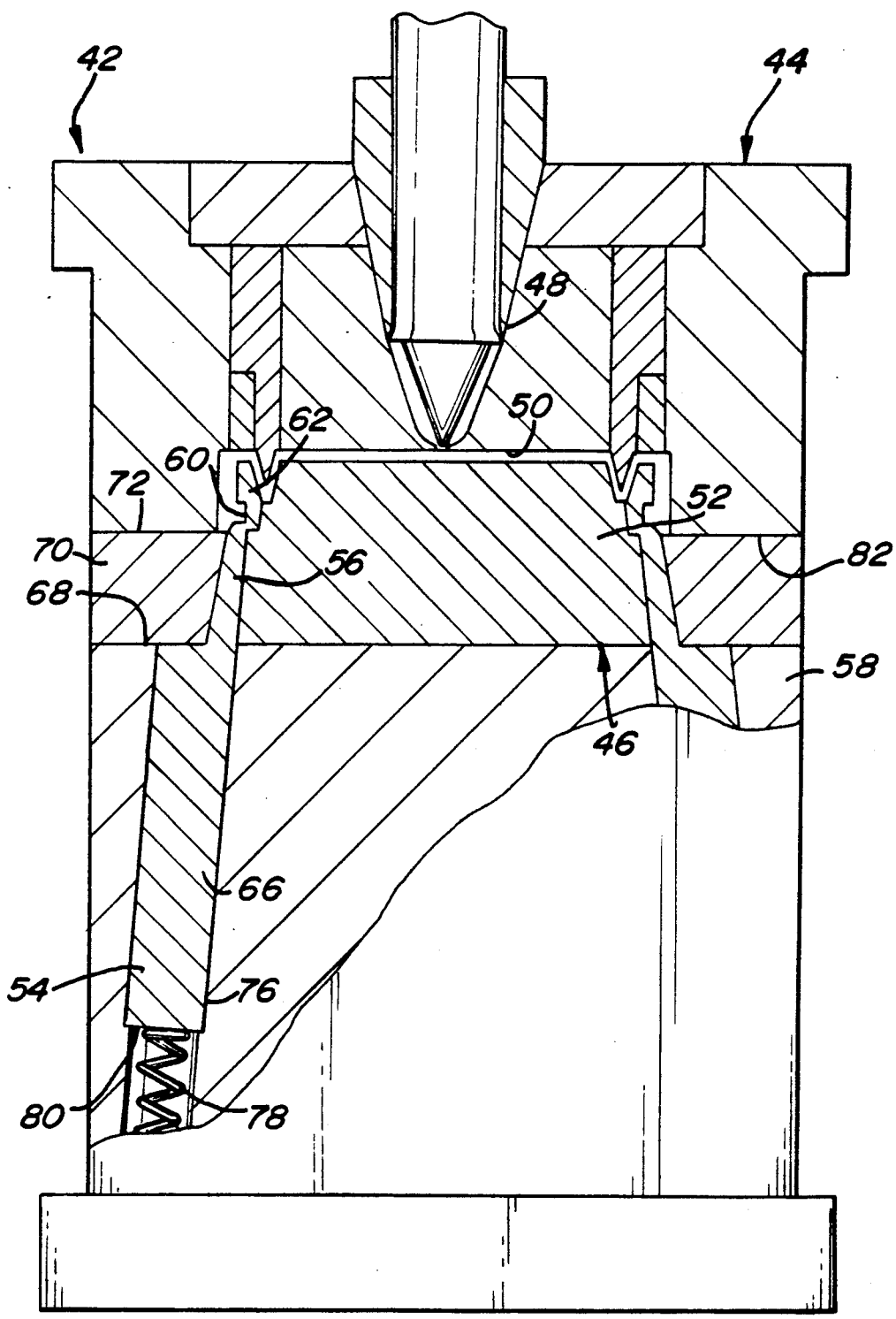
FIG. 4 is a cross sectional view of a mold assembly constructed in accordance with the present invention.
Figure 5:
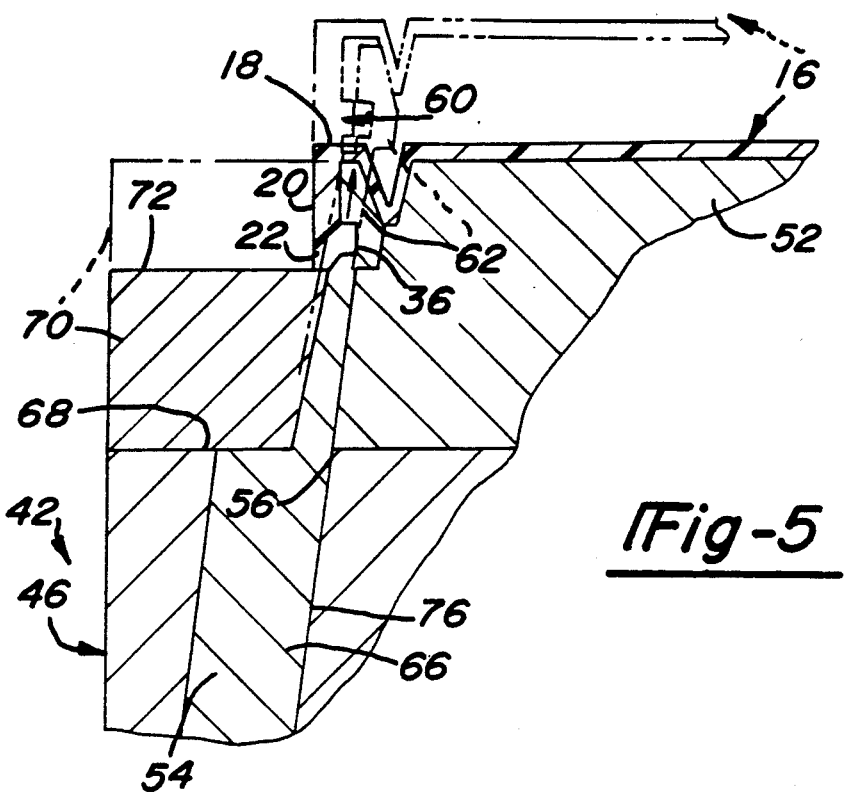
FIG. 5 is a fragmentary cross sectional view of the subject molding apparatus showing the mechanism for releasing a molded cap therefrom.
Figure 6:
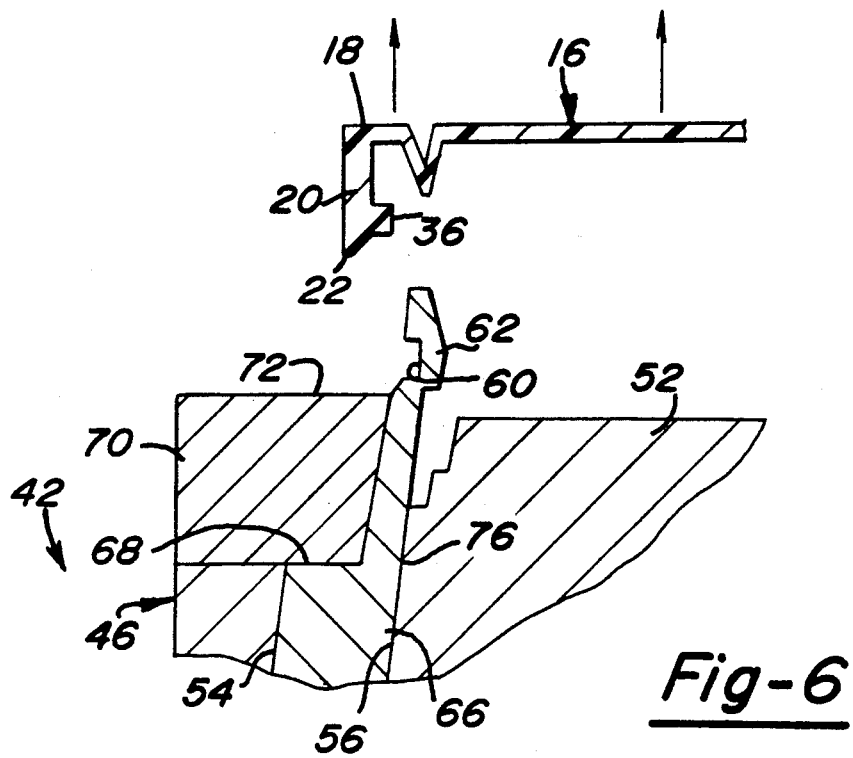
FIG. 6 is a fragmentary cross sectional view of the subject apparatus having released a cap member therefrom.

An apparatus for molding the cap 16 including the base portion 18 and peripheral skirt extending axially from and about the base portion 18 is generally shown at 42 in FIGS. 4–6. The apparatus 42 generally includes means for forming an outer surface of the base portion 18 and peripheral skirt 20 and mean seatable within the first mentioned molding means for forming an inner surface of the base portion 18 and the peripheral skirt 20. More specifically, the apparatus includes a retractable upper mold half generally indicated at 44 seatable over a lower fixed mold 46. The upper mold half 44 includes a polymer injection nozzle 48 for injecting polymer into a cavity 50 formed between the seated mold halves 44,46. The retractable mold half 44 is retractable from seated engagement with the fixed inner surface mold half 46 for exposure of the cap molded therebetween within cavity 50.

Generally, the inner surface mold half 46 includes a core portion 52 and a cap release mechanism in the form of retractable pins 54 for projecting axially from and retracting radially inwardly relative to the core portion 52 for releasing and ejecting the molded cap 16 from the inner surface forming mold 46.

More specifically, the core portion 52 has a radially peripheral surface 56. The cap release mechanism includes a plurality of lug forming mold portions or pins 54 spaced about the radial periphery 56 of the core portion 52. Each lug forming mold portion 54 is a pin seated within a channel formed between the core portion 52 and an outer mold housing 58. The lug forming mold portions 54 are moveable axially from and angling radially inwardly towards the core portion 52, as shown in phantom in FIG. 5 and shown in solid lines in FIG. 6 from a seated position as shown in FIG. 4 to raise and eject a molded cap 16 from the core portion 52 while moving radially inwardly from the molded cap 16 to release the lug forming mold portions 54 from the formed lugs 36 in the molded cap 16. More specifically, each of the lug forming mold portions 54 include a head portion 62 having a lug forming recess 60. As the pins 54 move upwardly and angle inwardly, the head portion 62 which includes the lug forming recess 60 moves in two vectors. It is moved in an upward vector forcing the molded cap 16 upwardly. The head portion 62 also moves in an radially inward vector thereby unseating the formed lug portion 36 from the recess 60 such that the cap member 16 can be released from the head portion 62. Otherwise, if the pins 54 move solely in an upward direction, the lugs 36 would remain seated in the recesses 60 and would have to be otherwise forced therefrom. Thusly, the present invention provides an effective means for first forming a cap member having lugs extending radially inwardly from the cap 16 from the inner surface of the inner surface mold means.

The mold apparatus 42 includes means operatively connected to the lug forming mold portions 54 for forcing the peripheral edge 22 of the peripheral skirt 20 of the molded cap 16 from the core portion 52 axially relative thereto as the lug forming mold portions 54 move axially and angle radially inwardly. More specifically, each of the lug forming mold portions 54 include a body portion 66 and the head portion 62 and a shoulder portion 68 extending radially from the head portion 62 and over the body porton 66. The head portion 62 has an outer surface including the lug forming recess 60 defining a portion of the means for forming the inner surface of the cap 16. The recess 60 forms the projecting lug 36 on the inner surface of the peripheral flange 20. A ring member 70 is seated on the shoulder portions 68 for providing the means for axial displacing the cap member 16. The ring member 70 has a top surface 72 for defining a mold surface for forming and abutting against the peripheral edge 22 of the peripheral skirt 20 whereby upward and angling displacement of the lug forming mold portions 54 axially displaces the ring member 70 which abuts against and axially displaces the molded cap from the inner surface mold half 46. It is the outwardly tapering inner surfaces 40 of the cap 16 that allow for the head portions 62 to slide radially inwardly relative thereto as the ring member 72 moves in a single axially upward vector relative to the core portion 52. Thusly, as the head portion 62 of the lug forming mold members 54 release the cap member 16 molded thereon, the ring member 70 axially displaces the cap 16 therefrom as the top surface 72 of the ring member 70 abuts against the edge 22 of the skirt 20 of the cap 16. Thusly, the molded cap 16 is released from and ejected from the lower mold half 46.

As briefly described above, the core portion 52 includes an outer surface 56 having a plurality of channels angling radially inwardly relative to the remainder of the core portion 52. The lug forming mold portions 54 include inner surfaces 76 in sliding engagement with the channels. The apparatus 42 includes spring members 78, as shown in FIG. 4, disposed within the channels and engaging the bottom surface 80 of the lug forming mold portions 54 to force the lug forming mold portions 54 to extending axially and angle radially inwardly from the channels when the retractable outer surface mold 44 is unseated from the inner surface mold 46. More specifically, the outer surface mold half 44 includes a bottom surface 82 which engages the top surface 72 of the ring member 70 when seated over the inner surface mold half 46 for forcing the lug forming mold portions 54 back into the channels. Thusly, once the cap 16 is molded, the retractable outer surface mold half 44 is unseated and retracted from the inner surface mold half 46. As the outer surface mold half 44 is retracted, the spring 78 biases the lug forming mold portions 54 axially upwardly and inwardly, the lug forming mold portions 44 axially displacing the ring member 70. The ring member 70 then axially displaces the cap 16 from the core portion 52 as the end portion 62 of the lug forming mold portion 54 move upwardly and inwardly thereby releasing the formed lugs 36 from the recesses 60.

The present invention further provides a method of molding the cap 16 including the base portion 18 and peripheral skirt 20 extending axially from and about the base portion 18, the method generally including the steps of seating the outer surface forming mold 44 about the core portion 52 thereby defining the mold cavity 50 therebetween. The outer and inner surfaces of the cap are formed within the mold cavity 50. The outer surface forming mold 44 is retracted from seated engagement with the core portion 52 thereby exposing the formed cap 16. The method is characterized by a peripheral mold portion comprising the lug forming mold portions 54 projecting axially from and retracting radially relative to the remainder of the core portion 52 for releasing and ejecting the formed cap 16 from the core portion 52. More specifically, the lugs 36 are formed to project radially inwardly from the inner surface of the peripheral flange 20 within recesses 60. The peripheral mold portions defining the lug forming mold portions 54 move axially from and angle radially away from the formed lugs 36 releasing the lugs 36 from the peripheral mold portions 54.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of molding a cap (16) including a base portion (18) and a peripheral skirt (20) extending axially from and about said base portion (18), said method including the steps of: seating an outer surface forming mold (44) about a core portion (52); forming an outer surface of the base portion (18) and the peripheral skirt (20) within a mold cavity (50); forming an inner surface of the base portion (18) and the peripheral skirt (20) about the core portion (52); retracting the outer surface forming mold (44) from seated engagement with the core portion (52); exposing the formed cap (16); and projecting axially from and retracting radially a peripheral molded portion (54) of the core portion relative to the remainder thereof for releasing and ejecting the formed cap (16) form the core portion (52), outwardly biasing the peripheral mold portion (54) through angled channels in the core portion 952) to eject and release the molded cap (16) from the core portion (52) to eject and release the molded cap (16) from the core portion (52) and forcing the peripheral mold portions (54) back into the channels against the biasing force during said forming steps.

2. A method as set forth in claim 1 further including the step of additionally forcing a peripheral edge (22) of the peripheral skirt (20) of the molded cap (16) from the core portion (52) axially relative to the core portion (52) as the peripheral mold portions (54) move axially and angle radially inwardly.

3. An apparatus (42) for molding a cap (16) including a base portion (18) and a peripheral skirt (20) extending axially from and about said base portion (18), said apparatus (42) comprising: outer surface mold means (44) for forming an outer surface of the base portion (18) and the peripheral skirt (20); inner surface molded means (46) seatable within said outer surface mold means (44) for forming an inner surface of the base portion (18) and the peripheral skirt (20), said outer surface mold means (44) being retractable from seated engagement with said inner surface mold means (46) for exposure of the molded cap (16) therebetween, said inner surface mold means (46) including a core portion (52) and cap release means (54) for projecting axially from and retracting radially inwardly relative to said core portion (52) for releasing and ejecting the cap (16) from said inner surface mold means (46), said core portion (52) includes a radial peripheral surface (56), said cap release means including a plurality of lug forming mold portion (54) spaced about said radial periphery (56) of said core portion (52) and means for biasing said lug forming mold portions, said means for biasing disposed to bias said lug forming mold portions (54) to extend axially and angle radially inwardly towards said core portion (52) to raise and eject a molded cap (16) from said core portion (52) while moving radially inwardly from the molded cap (16) to release said lug forming mold portions (54) from the formed lugs (36) in the molded cap (16).

4. An apparatus as set forth in claim 3 including axial displacement means operatively connected to said lug forming mold portions (54) for forcing a peripheral edge of the peripheral skirt (20) of the molded cap (16) from said core portion (52) axially relative thereto as said lug forming mold portions (54) move axially and angle radially inwardly.

5. An apparatus as set forth in claim 4 wherein each of said lug forming mold portions (54) includes a body portion (66) and a head portion (62) and a shoulder portion (68) therebetween, said head portion (62) having an outer surface including a lug forming recess (60) defining a portion of said inner surface mold means for forming a projecting lug (36) on the inner surface of the peripheral skirt (20), said axial displacement means including a ring member (70) seated on said shoulder portion (68) and having a top surface (72) for defining a mold surface for forming and abutting against a peripheral edge (22) of the peripheral skirt (20) whereby upward and angling displacement of said lug forming mold portions (54) axially displaces said ring member (70) which abuts against and axially displaces the molded cap from said inner mold means.

6. An apparatus (42) for molding a cap (16) including a base portion (18) and a peripheral skirt (20) extending axially from and about said base portion (18), said apparatus (42) comprising: outer surface mold means (44) for forming an outer surface of the base portion (18) and the peripheral skirt (20); inner surface mold means (46) seatable within said outer surface mold means (44) for forming an inner surface of the base portion (18) and the peripheral skirt (20), said outer surface mold means (44) being retractable from seated engagement with said inner surface mold means (46) for exposure of the molded cap (16) therebetween, said inner surface mold means (46) including a core portion (52) and cap release means (54) for projecting axially from and retracting radially inwardly relative to said core portion (52) for releasing and ejecting the cap (16) from said inner surface mold means (46), said core portion (52) including a radial peripheral surface (56), said cap release means including a plurality of lug forming mold portions (54) spaced about said radial periphery (56) of said core portion (52), said lug forming mold portions (54) being movable axially from and angling radially inwardly towards said core portion (52) to raise and eject a molded cap (16) from said core portion (52) while moving radially inwardly from the molded cap (16) to release said lug forming mold portions (54) from the formed lugs (36) in the molded cap (16), said core portion (52) including an outer surface (56) having a plurality of channels angling radially inwardly relative to the remainder of said core portion (52), each of said lug forming mold portions (54) including an inner surface (76) in sliding engagement with one of said channels, said apparatus (42) including biasing means in each of said channels and engaging said lug forming mold portions disposed therein for biasing said lug forming mold portions (54) to extend axially and angle radially inwardly from said channels when said outer surface mold means (44) is unseated from said inner surface mold means (46), said outer surface mold means (44) including a bottom surface (88) engaging said ring member (70) when seated over said inner surface mold means (46) for forcing said lug forming mold portions (54) back into said channels.

* * * * *

UNITED STATES PATENT AND TRADEMARK OFFICE
CERTIFICATE OF CORRECTION

PATENT NO. : 5,053,182
DATED : October 1, 1991
INVENTOR(S) : Peter Hedgewick

It is certified that error appears in the above-identified patent and that said Letters Patent is hereby corrected as shown below:

Column 1, line 48, delete "man facturing" and insert -- manufacturing--.

Column 6, Claim 1, line 1, delete "form" and insert -- from--.

Column 6, Claim 1, lines 3 and 4, delete "952) to eject and release the molded cap (16) from the core portion".

Signed and Sealed this

Thirteenth Day of April, 1993

Attest:

STEPHEN G. KUNIN

Attesting Officer

Acting Commissioner of Patents and Trademarks